Figure 1:
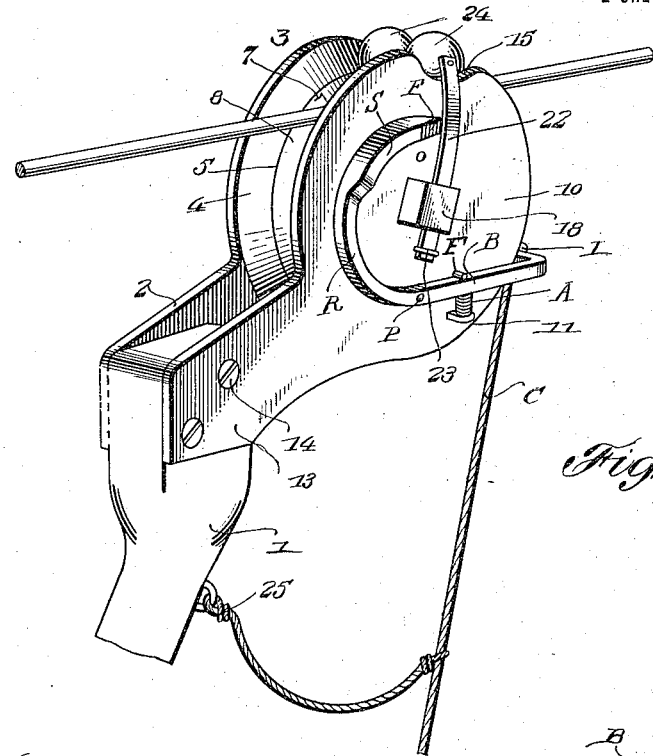

W. S. GRIFFITH.
TROLLEY WHEEL.
APPLICATION FILED DEC. 12, 1913.

1,155,913.

Patented Oct. 5, 1915.
2 SHEETS—SHEET 1.

Inventor
W. S. Griffith,

Witnesses

By Victor J. Evans
Attorney

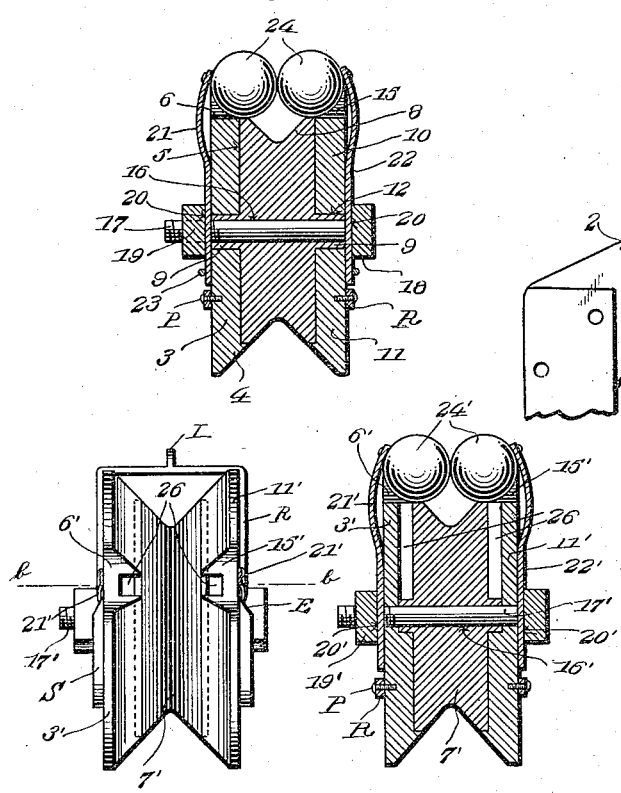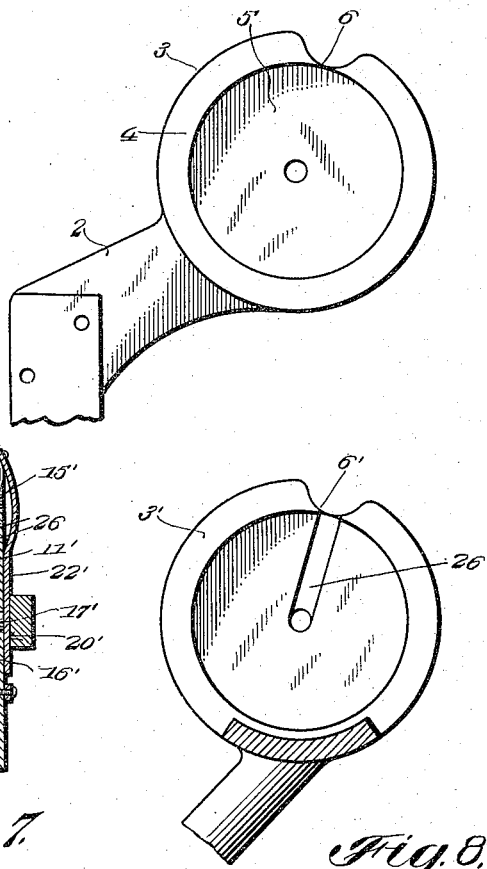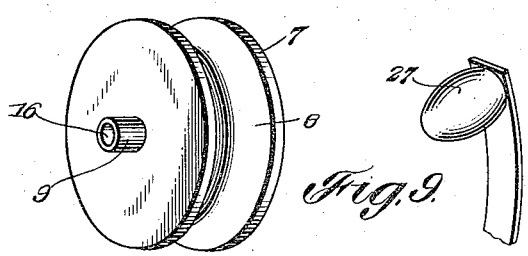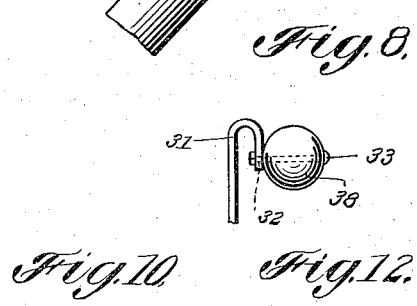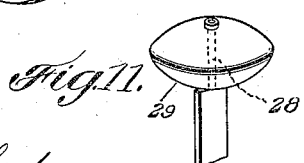

UNITED STATES PATENT OFFICE.

WILLIAM S. GRIFFITH, OF HOMER CITY, PENNSYLVANIA.

TROLLEY-WHEEL.

1,155,913.  Specification of Letters Patent.  Patented Oct. 5, 1915.

Application filed December 12, 1913. Serial No. 806,296.

*To all whom it may concern:*

Be it known that I, WILLIAM S. GRIFFITH, a citizen of the United States, residing at Homer City, in the county of Indiana and State of Pennsylvania, have invented new and useful Improvements in Trolley-Wheels, of which the following is a specification.

The present invention relates to trolley wheels and harps for trolley poles, and resides in the construction, combination and arrangement of parts set forth in the following description and falling within the scope of the appended claims.

In the drawings there has been illustrated a simple and preferred reduction of my improvement to practice, but the important instrumentalities thereof may be varied, and so it is to be understood that such changes may be made therein as fall within the scope of my claims.

Figure 2:
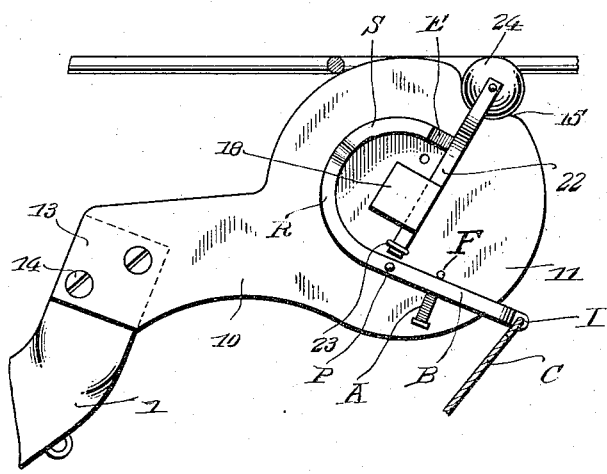
Figure 3:
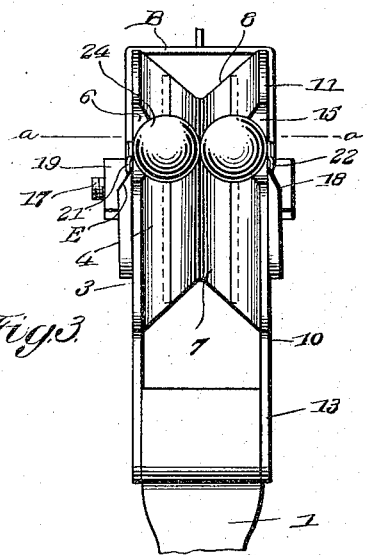

In the drawings: Figure 1 is a perspective view of my improvement arranged upon the trolley wire, Fig. 2 is a view illustrating the position of the harp and pole when contacted with a branch or cross wire, Fig. 3 is a top plan view of a device as illustrated in Fig. 1, Fig. 4 is a sectional view on the line $a$—$a$ of Fig. 3, Fig. 5 is a detail view of the harp, one of the sides thereof being removed, Fig. 6 is a top plan view of a modified form of the harp and wheel, the spring arms of the retaining members being shown in section, Fig. 7 is a vertical sectional view on the line $b$—$b$ of Fig. 6, Fig. 8 is a view of the harp, parts being broken away, Fig. 9 is a perspective view of the trolley wheel, Fig. 10 is a perspective view illustrating a modified form of one of the trolley wire sustaining elements associated with the wheel and harp, Fig. 11 illustrates a still further modified form of a sustaining element, and Fig. 12 illustrates a further modification.

In one of the forms of my invention, the trolley pole 1 has integrally connected therewith an enlarged preferably offset member 2 provided with a rounded head 3, the said head being inclined from its periphery toward the center thereof, as indicated by the numeral 4, and the said head has its inner face provided with a pocket 5, the outer wall of which is circumferential, and the inner wall of which is flat and straight. The head 4 is provided with a peripheral rounded depression 6 which terminates at the juncture of its angular face and the wall provided by the pocket 5. The pocket 5 is adapted to receive one of the side members of a trolley wheel 7, the said wheel being of the usual construction and having a central rounded groove which is formed with oppositely arranged angular walls which are inclined toward the periphery and opposite face of the wheel. These angular walls, designated by the numeral 8, are adapted, when the wheel is arranged within the pocket, to provide a continuation of the angular surface 4 of the head 3, and the inner wall of the pocket 5 is provided with an opening for the reception of one of the trunnions 9 which are provided upon the opposite faces of the wheel 7.

The numeral 10 designates the removable side of the harp. This side also includes a rounded head 11, which is of a size and shape corresponding with that of the head 3, the said head 11 being provided with an annular pocket, similar to the pocket 5, which is adapted for the reception of the opposite face of the trolley wheel 7. The flat inner wall of the pocket is formed with an opening 12 which provides a bearing for the second trunnion 9 of the wheel 7. The removable member 10 is of a similar shape and construction to the integral portions 2 and 3 of the pole 1, the same having a reduced portion 13 corresponding to the portion 2 and the said portion 13 is provided with openings for the reception of securing members 14 whereby the said member 10 is connected with the pole 1. The head 11 of the member 10 is provided with a peripheral depression 15, which is adapted to be arranged opposite the depression 6 in the head 4. The upper edge of the head 11 of the plate 10 is provided with a rounded depression 15, which is arranged opposite its end which coincides in shape with the depression 6 of the head 8.

The numeral 18 designates a headed bolt which has its shank 17 passing through a lateral opening 16 arranged centrally of the wheel 7 and through the trunnions on the wheel. The threaded end of the shank 17 is engaged by a nut 19, and both the nut 19 and the head of the bolt 18 are provided with slots or depressions 20. Adapted to be received within the said slots or depressions 20 are spring members 21 and 22, the same having one of their ends connected to the heads 3 and 11 of the harp, through the medium of straps 23. The springs are adapted to exert a tension toward the heads 11 and 13 at the upper portions of the heads, and the free ends of the springs are adapted to be received within the depressions 6 and 15 of said head. Pivotally connected with the free ends of the springs and overlying the trolley wheel 7, are trolley-sustaining members in the nature of balls or spheres 24. By such an arrangement, it will be noted that the springs 21 and 22 prevent the rotation of the bolt 17 and the removal of the nut 19 from the said bolt. Furthermore, the members 24 being disposed directly over the wheel prevent the said wheel and harp accidentally jumping the trolley wire. The pressure of the springs is not, however, sufficient to prevent the trolley wheel being brought out of engagement with the trolley wire, when the wheel is drawn away from the wire by the usual rope or cable 25, the rounded surface of the said members 24 permitting the separation or spreading of the said members when a pull is exerted upon the operating cord or cable to bring the members into contact with the feed or conducting wire. Likewise the spherical members will spread apart when contacted by the vertical member of a supporting clamp for the feed wire.

While in the above description the plate 10 has been described as a detachable member, it is to be understood that the plate 2 may also be formed separate from the pole 1 and attached thereto, if desired.

In some instances it has been found desirable to construct the harp of a single element, and the said harp may be connected with the pole or may be integrally formed therewith as desired. In such instances, the harp is of a structure substantially similar to that described, the heads 3' and 11' being provided with pockets for the reception of the trolley 7'. The heads of the harp are formed with oppositely arranged depressions 6' and 15', and with central openings similar to those within which the trunnions 9 of the wheel 7' is received. In instances where it has been found desirable or preferable to provide the wheel 7' with trunnions, the inner faces of the heads 3' and 11' are provided with channels which communicate with the lower walls of the depressions 6' and 15' and with the central openings in the head members of the harps, the said channels being designated by the numerals 26. The trunnions of the wheel, as well as the wheel proper, have a central opening 16', which is adapted for the reception of a headed bolt 17', and the bolt has a securing nut 19'. Both the nut and the head of the bolt have recesses 20', the said recesses adapted to receive springs 21' and 22', similar to the springs 21 and 22, one of the ends of each of the springs being secured to the outer face of the heads of the harp, the springs exerting an inward tension to prevent the accidental revolution of the nut and bolt. The springs are provided with pivoted retaining elements in the nature of spheres 24'.

It is to be understood that I do not desire to restrict myself to the employment of balls or spheres as retaining elements for the trolley harp, but as illustrated in Fig. 10 of the drawings, cone-shaped members 27 may be pivotally connected with the springs if desired, or as illustrated in Fig. 11 of the drawings, the said springs may have their upper extremities provided with rounded extensions 28 which provide each of said springs with a shoulder that serves as bearings for rounded members 29 which may have both of their faces convex, so that the same may be reversed when one of the faces is worn, it being essential that the lower face of said member 29 be of such a formation. Again, and as illustrated in Fig. 12 of the drawings, the spring members may have their upper ends offset, as at 31, and provided with an opening 32 through which passes an element 33 that is secured to the angular portion of the spring and which also serves as a bearing for a rounded retaining member 38.

In order to bring the retaining elements away from the wire, when it is desired to lower the trolley pole, I provide the harp with a bail B, the connecting member of the bail being arranged adjacent the transverse edge or face of the harp, the said connecting member being formed with an eye to which is secured a cable C, and the side arms of the bail are pivotally connected, as at P to the opposite sides or faces of the harp. The side arms are arranged at a right angle to the connecting member of the bail for a suitable distance, but beyond their pivots P are rounded as at R, and terminate in a beveled edge E which is disposed approximately diametrically opposite the pivot P. The beveled end E is formed upon the enlarged end of the rounded portion P of the bail, the said enlargement together with the beveled edge forming spreading members S, which when the cable C is forced downwardly of the harp engages between the spring arms of the retaining elements and spreads the same to bring the rounded members out of engagement with the trolley wire and permit of the harp being lowered from the wire. The bail B is influenced by resilient elements A in the nature of pressure springs which are secured to the opposite faces of the harp, and the limit of the movement of the bail by the tension of the said springs A is halted by stops F which are also secured upon the sides or faces of the harp and which engage with the upper edges of the bail.

Having thus described the invention, what I claim as new is:

1. In a device for the purpose set forth, a trolley pole provided with a harp including spaced rounded heads having rounded pockets, a trolley wheel arranged within the pockets, securing elements for the trolley wheel, springs, said springs co-acting with the securing elements for sustaining the same against movement, said springs adapted to exert a tension toward the trolley wheel, and revoluble retaining elements connected with the springs and overlying the trolley wheel.

2. In a device for the purpose set forth, the combination with a trolley wheel having a harp, said harp including oppositely disposed rounded heads having their inner faces beveled inwardly from their periphery, the said inner faces being depressed to provide pockets, a trolley wheel arranged within the pockets, securing means for retaining the wheel revoluble within the pockets, spring members secured to the heads and co-acting with the wheel sustaining means for securing the said means against displacement, the said heads having peripheral depressions, said springs adapted to exert a tension toward the trolley wheel and having their ends disposed within the peripheral depressions of the heads, and a pivoted spherical member for each of the springs and adapted to overlie the trolley wheel.

3. In a device for the purpose set forth, a trolley pole provided with a harp, spring members secured to the opposite sides of the harp and rotatable members connected with the springs and arranged over the wire receiving groove of the trolley wheel of the harp, spring pressed members pivotally connected with the harp, stops for limiting the movement of the springs in one direction, said members each having a cam associated therewith and arranged adjacent the spring members secured to the harp, and a cable for swinging the spring pressed members to bring their cam faces between the sides of the harp and the spring members to force the spring members outwardly of the harp and the rotatable members to the opposite sides of the groove of the trolley wheel.

4. The combination with a trolley harp having a trolley wheel associated therewith, arms secured upon the opposite faces of the harp, revoluble members connected with the arms and disposed over the groove of the wheel, a bail having its arms pivotally secured to the sides of the harp, said bail having a rounded end, the said end being enlarged and having its extremities beveled and arranged to engage between the arms and the opposite faces of the harp, an operating cable connected with the bail, a spring for forcing the bail in one direction, and a stop for limiting the movement of the bail in the said direction.

In testimony whereof I affix my signature in presence of two witnesses.

WILLIAM S. GRIFFITH.

Witnesses:
J. C. McGregor,
Jno. L. McAllister.

Copies of this patent may be obtained for five cents each, by addressing the "Commissioner of Patents, Washington, D. C."